(12) United States Patent
Kim et al.

(10) Patent No.: US 8,351,494 B2
(45) Date of Patent: Jan. 8, 2013

(54) CHANNEL EQUALIZATION AND CARRIER RECOVERY METHOD AND RECEIVER IN HIGH SPEED WIRELESS COMMUNICATION SYSTEM

(75) Inventors: Dong Kyoo Kim, Daejeon (KR); Young Jin Kang, Jeollabuk-do (KR); Jae Young Kim, Daejeon (KR); Kwang Roh Park, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 909 days.

(21) Appl. No.: 12/514,837

(22) PCT Filed: Nov. 16, 2007

(86) PCT No.: PCT/KR2007/005773
§ 371 (c)(1),
(2), (4) Date: May 14, 2009

(87) PCT Pub. No.: WO2008/060118
PCT Pub. Date: May 22, 2008

(65) Prior Publication Data
US 2010/0040129 A1  Feb. 18, 2010

(30) Foreign Application Priority Data

Nov. 17, 2006 (KR) ........................ 10-2006-0114123

(51) Int. Cl.
*H04L 27/01* (2006.01)
(52) U.S. Cl. ...................................................... 375/232
(58) Field of Classification Search .................. 375/232, 375/260–261, 324, 326, 346, 350; 370/210, 370/500
See application file for complete search history.

(56) References Cited

U.S. PATENT DOCUMENTS 6,603,811 B1 * 8/2003 Dobson et al. ................ 375/232
6,671,339 B1   12/2003 Ahn
6,704,317 B1 * 3/2004 Dobson ......................... 370/401
(Continued)

FOREIGN PATENT DOCUMENTS

JP        2000-115122 A        4/2000
(Continued)

OTHER PUBLICATIONS

International Search Report—mailed Feb. 20, 2008; PCT/KR2007/005773.

*Primary Examiner* — Khanh C Tran
(74) *Attorney, Agent, or Firm* — Ladas & Parry LLP

(57) ABSTRACT

Provided are a channel equalization and carrier recovery method and a receiving apparatus thereof. In the method, a receiver of the high speed wireless communication system obtains an initial value of a channel equalization coefficient through non-causal channel estimation in a frequency domain during a preamble transmission section of a packet. High-order QAM signal correction for updating the channel equalization coefficient in a time domain is performed during a data transmission section of the packet. when a payload section starts in the data transmission section of the packet, channel equalization coefficient tracking is performed on the basis of frequency domain decision, and a hard decision of a correction value by the high-order QAM signal correction in the time domain is made to correct carrier phase errors, so that the channel equalization coefficient is updated.

22 Claims, 9 Drawing Sheets

U.S. PATENT DOCUMENTS

| | | |
|---|---|---|
| 6,912,258 B2 | 6/2005 | Birru |
| 7,319,659 B2 * | 1/2008 | Tsuie .......................... 370/203 |
| 7,321,550 B2 * | 1/2008 | Kao et al. ...................... 370/208 |
| 7,646,833 B1 * | 1/2010 | He et al. ........................ 375/346 |
| 2003/0039219 A1 | 2/2003 | Kwak |
| 2003/0231708 A1 | 12/2003 | Kim et al. |
| 2004/0076239 A1 | 4/2004 | Yu et al. |
| 2004/0105507 A1 | 6/2004 | Chang et al. |
| 2004/0156459 A1 | 8/2004 | Kwon et al. |

FOREIGN PATENT DOCUMENTS

| | | |
|---|---|---|
| KR | 1998-0035453 A | 8/1998 |
| KR | 1020020073761 A | 9/2002 |
| KR | 1020040022788 A | 3/2004 |
| KR | 1020040048787 A | 6/2004 |
| KR | 1020040071545 A | 8/2004 |
| KR | 10-0448633 B1 | 9/2004 |
| KR | 1020050080680 A | 8/2005 |

* cited by examiner

[Fig. 1]
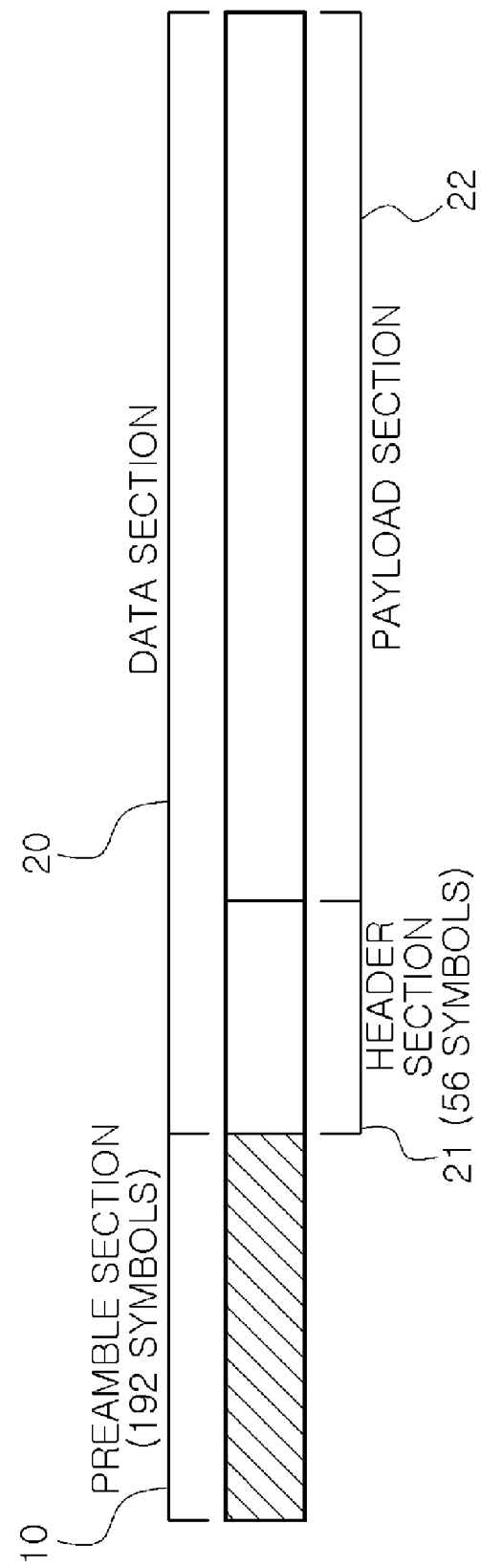

[Fig. 2]
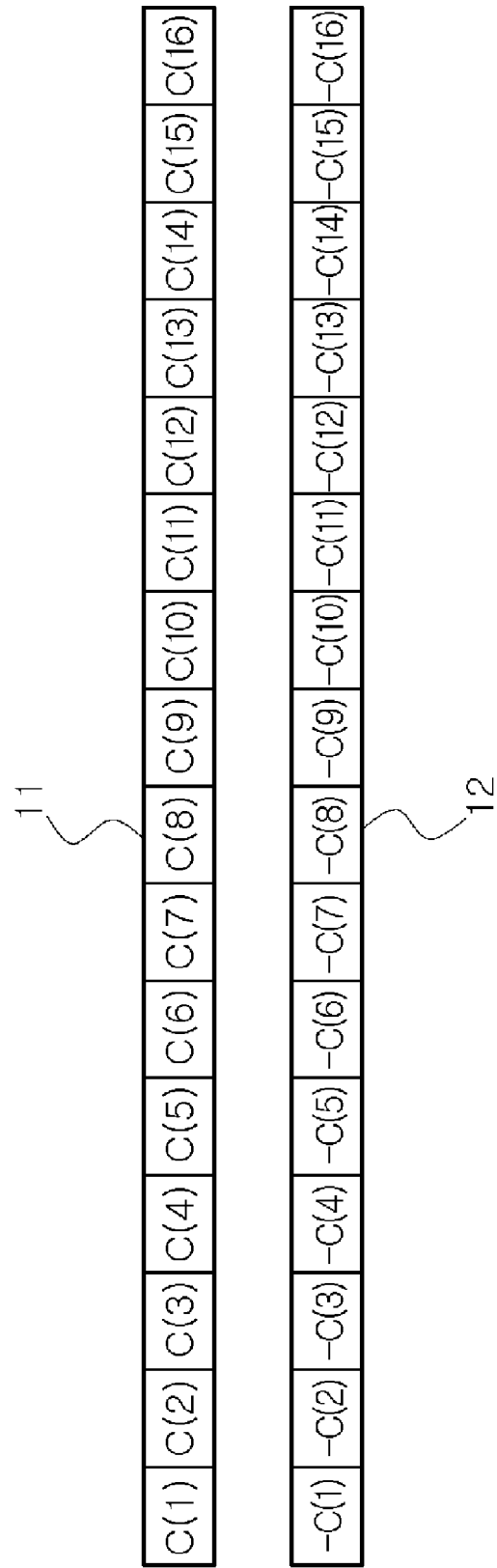

[Fig. 3]
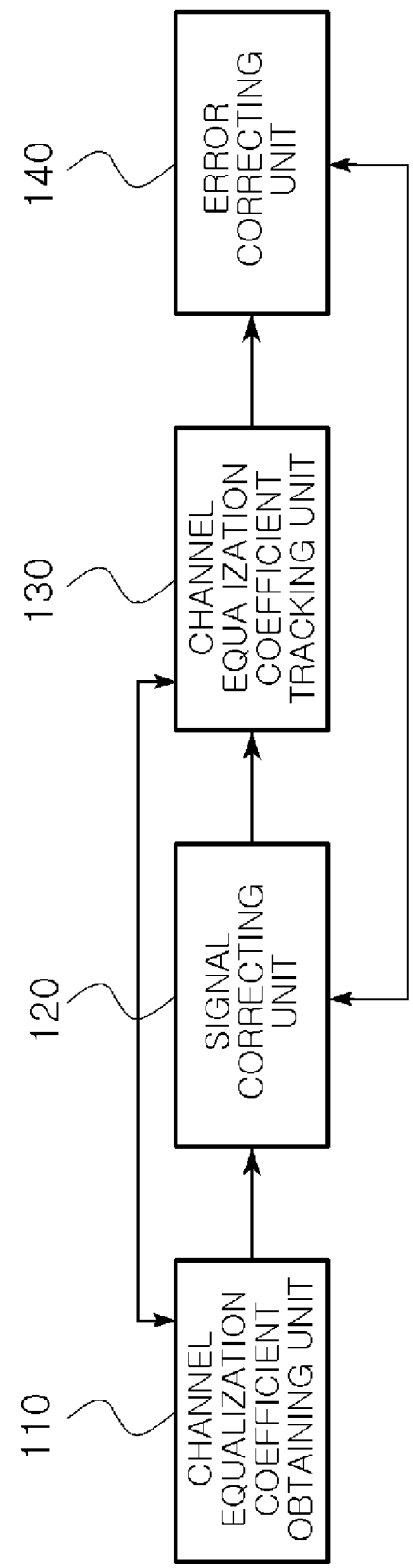

[Fig. 4]
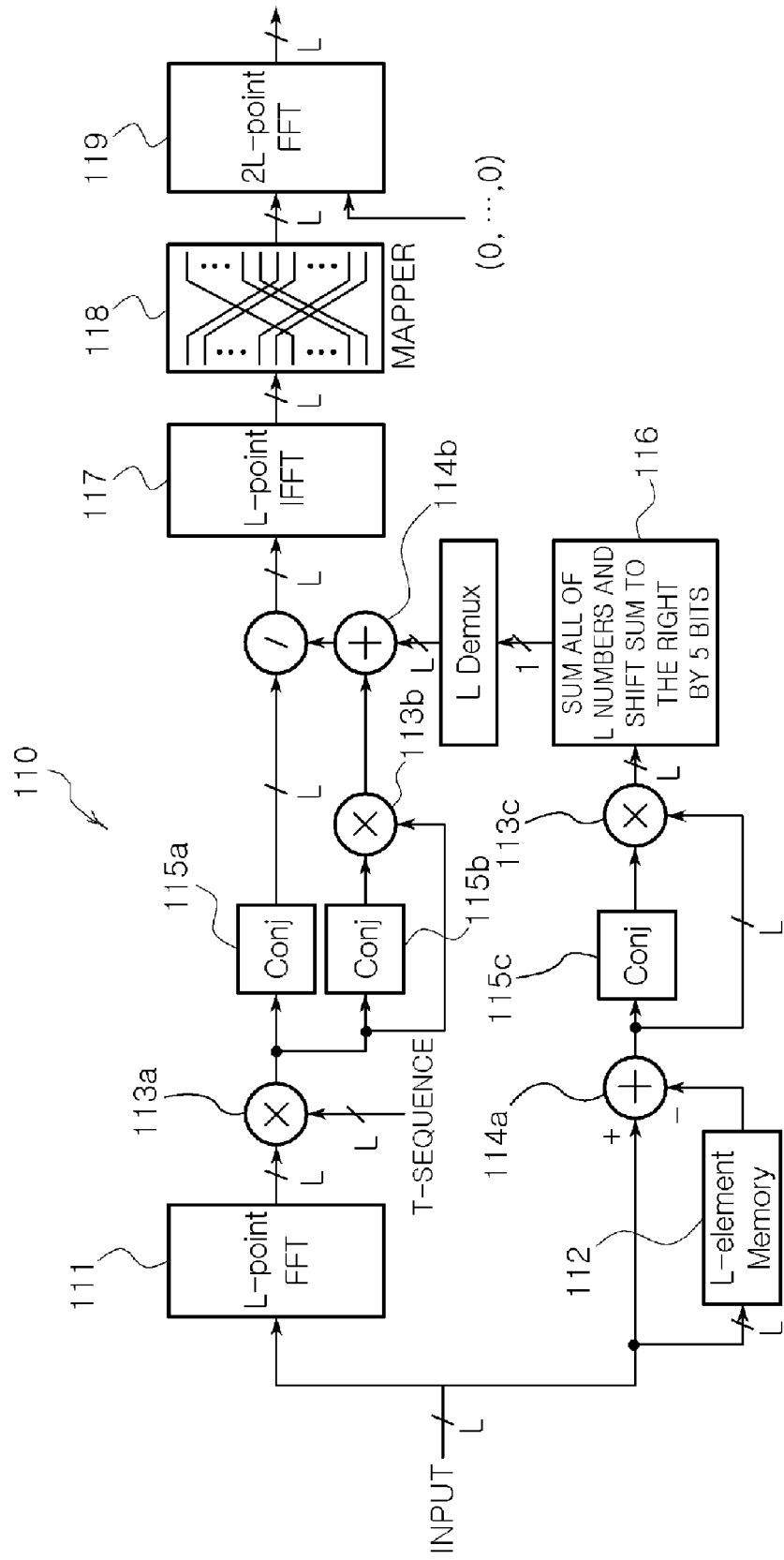

[Fig. 5]
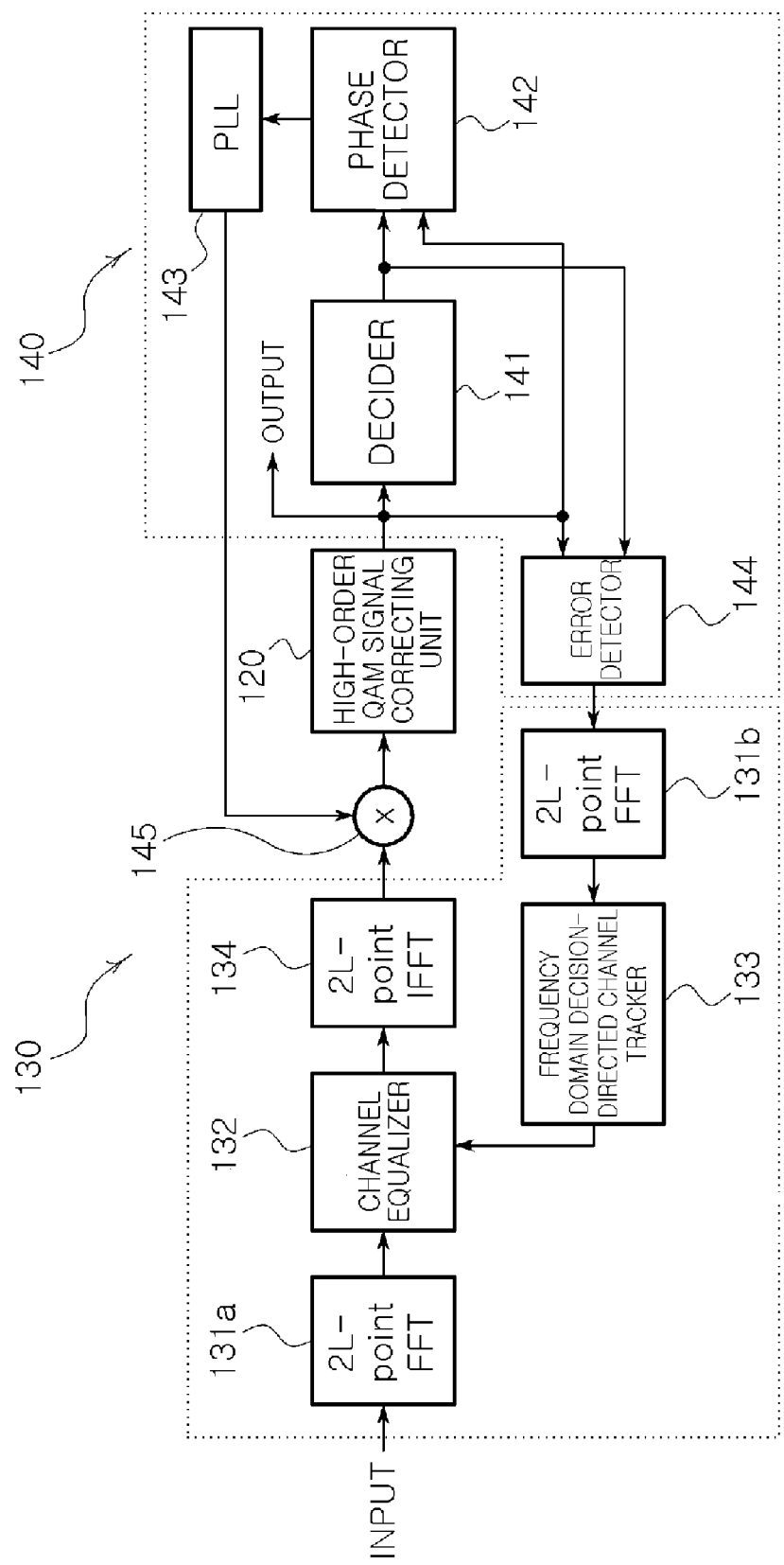

[Fig. 6]
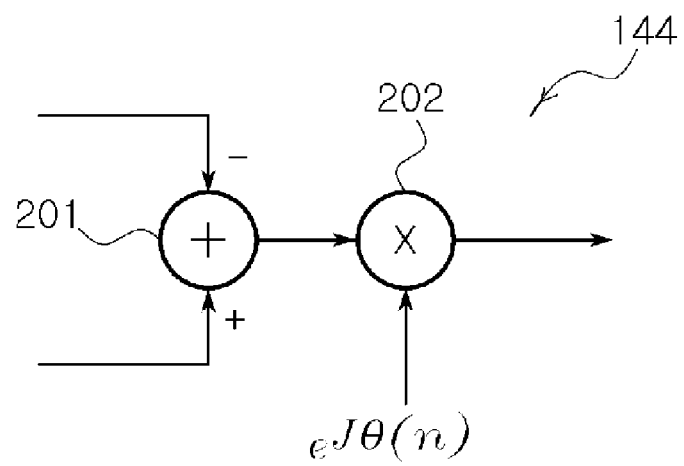

[Fig. 7]
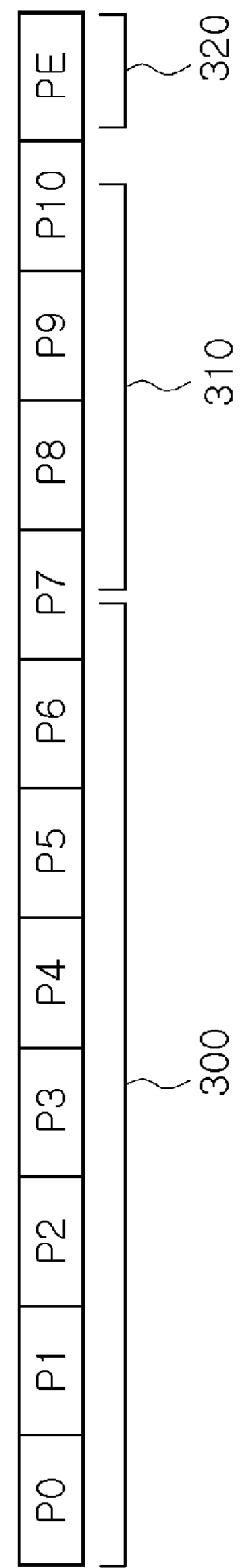

[Fig. 8]
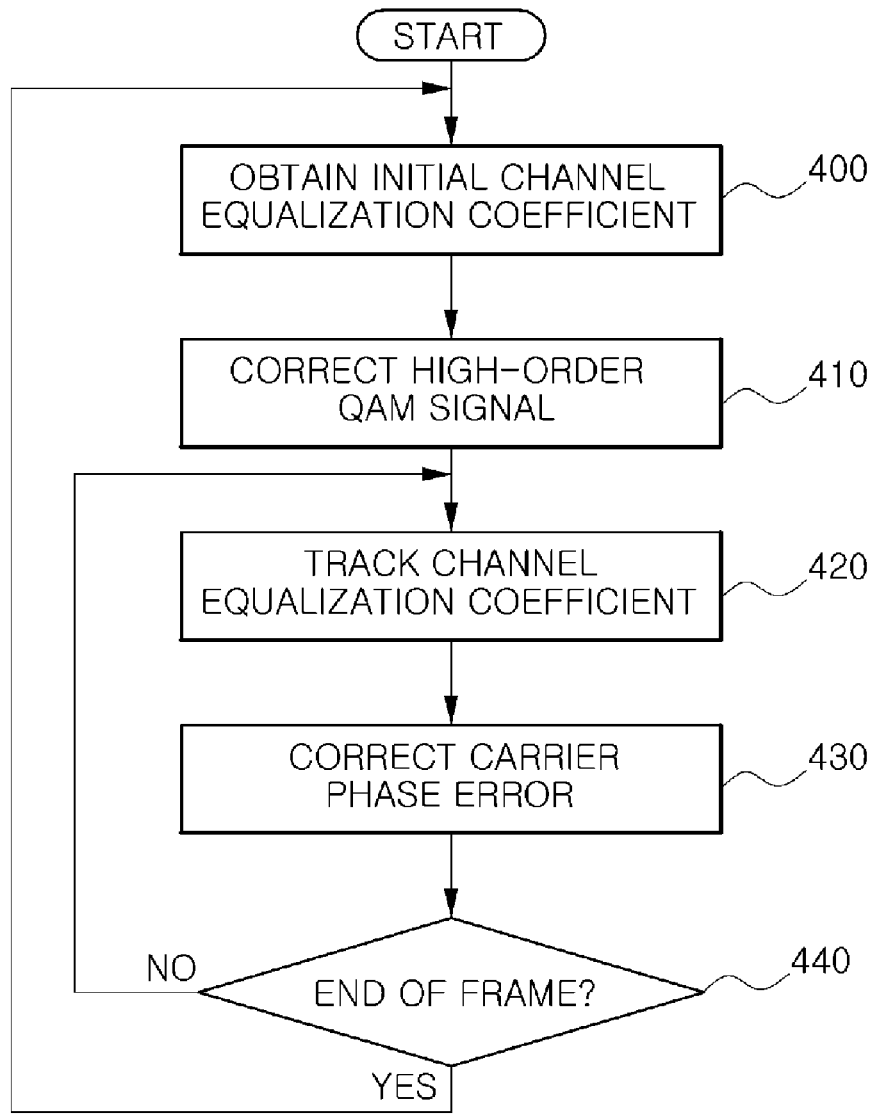

[Fig. 9]
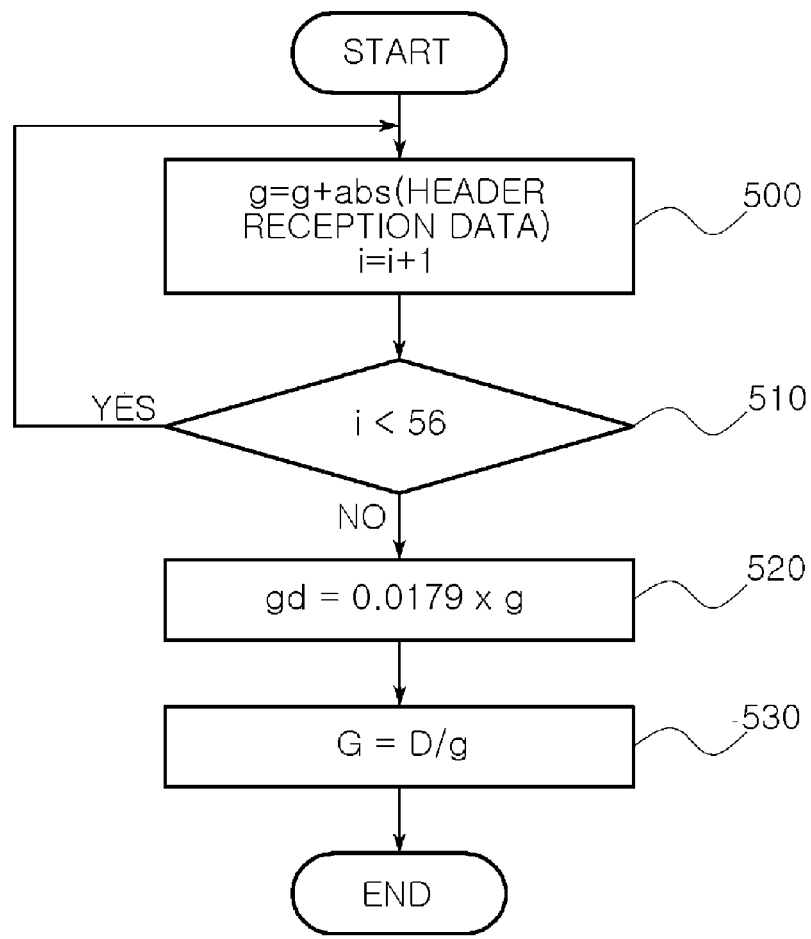

CHANNEL EQUALIZATION AND CARRIER RECOVERY METHOD AND RECEIVER IN HIGH SPEED WIRELESS COMMUNICATION SYSTEM

TECHNICAL FIELD

The present invention relates to a channel equalization and carrier recovery method and an apparatus thereof in a high speed wireless communication system, and more particularly, a method and an apparatus for equalizing a data section channel and recovering carrier waves by obtaining, at a reception terminal of a single-carrier digital modem system, a non-data section channel equalization constant using a limited preamble.

This work was supported by the IT R&D program of MIC/IITA [2005-S-030-02, The development of high data rate WPAN based very high-speed wireless home networking technology]

BACKGROUND ART

Digital modem technology using a multi-carrier method such as orthogonal frequency division multiplexing (OFDM) should use complicated reception terminal synchronization technology for precise signal synchronization, a high-priced amplifier having a linear characteristic, and high-priced analog-to-digital (AD)/digital-to-analog (DA) converters having high resolution. Meanwhile, since digital modem technology using a single-carrier method uses simple reception terminal synchronization technology, a low-priced amplifier, and AD/DA converters having low resolution, can easily realize a low power/low-priced receiver having a simple structure. Since the advantage of the single carrier method is applied to low speed communication using a low-order quadrature amplitude modulation (QAM) or phase shift keying (PSK), the single carrier method is applied to mobile phone service using code division multiple access (CDMA).

In case of high communication using QAM signals of high order of 32-QAM or more, influences by a signal noise, channel distortion, and carrier synchronization reduce receiver performance. Particularly, in the case where wireless communication is performed in an indoor space, a variety of multi-path fading is generated due to complicated indoor environments to aggravate the channel distortion of received signals. Accordingly, conventional signal carrier receiver algorithm and structure cannot be used for a modem system for high speed indoor communication.

To overcome limitations of the multi-carrier method, single-carrier frequency domain equalization (SC-FDE) has been proposed recently. In SC-FDE, a transmission terminal converts signals into a block using a cyclic prefix and transmits the same as in OFDM, and a reception terminal converts signals into signals in a frequency domain to perform channel equalization.

The limitations of OFDM can be overcome using SC-FDE, but fast Fourier transform (FFT) and inverse fast Fourier transform (IFET) should be performed at the reception terminal, which makes the structure of a corresponding receiver complicated. Therefore, SC-FDE is not suited for wireless personal area network (WPAN) pursuing a simple receiver structure and low power consumption.

DISCLOSURE OF INVENTION

Technical Problem

An aspect of the present invention provides a method and a receiver for channel estimation, channel equalization, channel tracking, and carrier phase offset correction necessary for high speed wireless communication reception using a single-carrier method in an indoor environment using packet-based data transmission.

An aspect of the present invention also provides a method for obtaining a channel equalizer coefficient having a best performance using an equalizer of a limited order, performing channel tracking in data transmission section, and correcting carrier phase offset using channel information obtained using non-causal channel estimation.

An aspect of the present invention also provides a method for discriminating a header section from a payload section inside a data transmission section to precisely correct high-order QAM signals.

An aspect of the present invention also provides a channel equalization and carrier recovery method and a receiver thereof for simultaneously performing channel tracking and carrier phase offset correction in a data transmission section.

Technical Solution

According to an aspect of the present invention, there is provided a channel equalization and carrier recovery method in a high speed wireless communication system, the method including: obtaining, an initial value of a channel equalization coefficient through non-causal channel estimation in a frequency domain during a preamble transmission section of a packet; performing a high-order quadrature amplitude modulation (QAM) signal correction for updating the channel equalization coefficient in a time domain during a data transmission section of the packet; updating the channel equalization coefficient by performing channel equalization coefficient tracking on the basis of a decision in the frequency domain when a payload section starts in the data transmission section of the packet; and correcting a carrier phase error by making a hard decision of a correction value by the high-order QAM signal correction in the time domain.

According to another aspect of the present invention, there is provided a receiving apparatus including: an initial channel equalization coefficient obtaining unit for obtaining an initial value of a channel equalization coefficient through non-causal channel estimation in a frequency domain during a preamble transmission section of a packet; a signal correcting unit for correcting a high-order QAM signal for updating the channel equalization coefficient in a time domain during a data transmission section of the packet; a channel equalization coefficient tracking unit for updating the channel equalization coefficient through channel equalization coefficient tracking on the basis of frequency domain decision when a payload section starts in the data transmission section of the packet; and a carrier phase error correcting unit for making a hard decision of a correction value by the high-order QAM signal correction in the time domain to output carrier phase offset, and detecting and correcting a carrier phase error.

Advantageous Effects

The present invention can perform high speed data communication using single-carrier transmission having a simple structure and low power consumption in an indoor environment where channel distortion due to multi-path is serious. Also, since the present invention can use a very small number of CAZAC sequences by estimating a non-causal channel in the frequency domain, an initial synchronization unit having higher performance can be designed.

BRIEF DESCRIPTION OF THE DRAWINGS

FIG. 1 is a view illustrating the structure of a packet according to an embodiment of the present invention.

FIG. 2 is a view illustrating a preamble of a receiver according to an embodiment of the present invention.

FIG. 3 is a view illustrating the structure of a receiver for channel equalization and carrier recovery in a single-carrier digital modem system according to an embodiment of the present invention.

FIG. 4 is a view illustrating the detailed structure of a channel equalization coefficient obtaining unit for obtaining the initial channel equalization coefficient of FIG. 3.

FIG. 5 is a view illustrating the detailed structure of the channel equalization coefficient tracking unit and the carrier phase error correcting unit of FIG. 3.

FIG. 6 is a view illustrating the detailed structure of the error detector of FIG. 5.

FIG. 7 is a view illustrating the usage of a preamble used by a receiver according to an embodiment of the present invention.

FIG. 8 is a view illustrating a process for channel equalization and carrier recovery according to an embodiment of the present invention.

FIG. 9 is a view illustrating a process for high-order QAM signal correction according to an embodiment of the present invention.

BEST MODE FOR CARRYING OUT THE INVENTION

Exemplary embodiments of the present invention that would be easily embodied by those of ordinary skill in the art will now be described in detail with reference to the accompanying drawings. Like reference numerals are used for like elements throughout the specification. In detailed description of operational principle according to the exemplary embodiments, well-known functions and well-known structures will not be described in detail to avoid ambiguous interpretation of the present invention.

An embodiment of the present invention will be described using a receiver suited for a high speed wireless communication system using high-order QAM signals having high efficiency of frequency through a single-carrier method providing a simple receiver structure and low power consumption in an indoor environment where multi-path fading is serious.

First, a packet structure of wireless personal area network (WPAN) technology according to an embodiment of the present invention is described with reference to FIG. 1.

The packet is roughly divided into two sections of a preamble (transmission) section 10 and a data section 20. The data section 20 is divided into a header section 21 and a payload section 22. The preamble section 10 and the header section 21 are modulated into quadrature phase shift keying (QPSK) signals, and the payload section 22 is modulated into high-order QAM signals.

In the above-described packet structure, the preamble section 10 includes a cazac sequence 11 formed of symbols having L=6, and a cazac sequence 12 of one phase inversion type as illustrated in FIG. 2. The cazac sequence 11 are repeatedly listed eleven times. Here, the cazac sequence used in the preamble section has sequence values of Table 1, for example.

TABLE 1

| CAZAC sequence | Value |
|---|---|
| C(1) | 1 + j |
| C(2) | 1 + j |
| C(3) | 1 + j |

TABLE 1-continued

| CAZAC sequence | Value |
|---|---|
| C(4) | 1 + j |
| C(5) | −1 + j |
| C(6) | −1 − j |
| C(7) | 1 − j |
| C(8) | 1 + j |
| C(9) | −1 − j |
| C(10) | 1 + j |
| C(11) | −1 − j |
| C(12) | 1 + j |
| C(13) | 1 − j |
| C(14) | −1 − j |
| C(15) | −1 + j |
| C(16) | 1 + j |

According to an embodiment of the present invention, an initial channel equalization coefficient obtaining operation is performed in the preamble transmission section, and the initial channel equalization coefficient obtaining operation is performed in a frequency domain on the basis of the repeated structure of the CAZAC sequence of the preamble. A non-causal channel estimation method is applied to simultaneously estimate a pre-cursor portion and a post-cursor portion of a channel. Therefore, the present invention provides better performance using only three CAZAC sequences than that of a conventional channel equalization coefficient obtaining method of adaptive training type that should use four or more CAZAC sequences by performing the channel equalization coefficient obtaining operation in the frequency domain.

The structure of a high speed wireless communication receiver for channel equalization and carrier recovery in a single-carrier high speed wireless communication system is described according to an embodiment of the present invention.

FIG. 3 is a view illustrating the structure of a high speed wireless communication receiver for channel equalization and carrier recovery in a single-carrier digital modem system according to an embodiment of the present invention.

Referring to FIG. 3, the high speed wireless communication receiver can include a channel equalization coefficient obtaining unit 110, a signal correcting unit 120, a channel equalization coefficient tracking unit 130, and a carrier phase error correcting unit 140.

When a packet of WPAN technology is received, the channel equalization coefficient obtaining unit 110 obtains an initial channel equalization coefficient during a preamble transmission section to calculate an initial value of a channel equalization coefficient. Here, the channel equalization coefficient initialized to the initial value is modified using a method for precise estimation of high-order QAM signals during the header section 21 inside the data transmission section 20, and modified using a decision-directed method for tracking a time variable channel during the payload section 22.

The signal correcting unit 120 discriminates the header section 21 and the payload section 22 inside the data transmission section 20 to precisely correct high-order QAM signals, that is, to correct the QAM signals such that the QAM signals have an appropriate position on a complex coordinate plane to correct the channel equalization coefficient.

When the payload section 22 starts, the channel equalization coefficient tracking unit 130 updates the channel equalization coefficient using a decision-directed method to track a time variable channel.

The carrier phase error correcting unit 140 makes a hard decision of a correction value by the high-order QAM signal correction in the time domain during the payload section of the data transmission section to estimate a carrier phase offset, and detect a carrier phase error. By doing so, the carrier phase error correcting unit 140 can recover not only signal distortion generated by a transmission channel but also a carrier phase offset generated at a reception terminal using a limited number of preambles.

The detailed structure of the channel equalization coefficient obtaining unit 110 in the receiver having the above-described structure is described in more detail with reference to the accompanying drawings.

FIG. 4 is a view illustrating the detailed structure of a channel equalization coefficient obtaining unit for obtaining the initial channel equalization coefficient of FIG. 3.

The channel equalization coefficient obtaining unit 110 is divided into an upper path portion and a lower path portion, and includes an inverse fast Fourier transformer (IFET) 117 for transforming result values obtained by dividing output values of the upper path portion and the lower path portion in a time domain, a mapper 118 for obtaining a channel equalization coefficient of the time domain, a fast Fourier transformer (FFT) 119 of a 2L-point, for finally obtaining an initial value of a channel equalization coefficient in a frequency region.

The upper path portion can include a combination of an L-point FFT 111, a plurality of multipliers 113a and 113b, a plurality of conjugates 115a and 115b, and a summer 114b. The lower path portion can include a combination of a memory 112, a conjugate 115c, a multiplier 113c, a shifter 116, and a demultiplexer. Here, the FFT 111 is an L-point FFT for receiving reception signals corresponding to C(L−npr+1) of a preamble P7 sequence to transform the signals into signals in a frequency domain. The IFFT 117 transforms signals in the frequency domain transformed through the upper path into signals in a time domain.

Next, the detailed structures of the channel equalization coefficient tracking unit 130 and the carrier phase error correcting unit 140 illustrated in FIG. 1 are described more specifically with reference to the accompanying drawings.

FIG. 5 is a view illustrating the detailed structure of the channel equalization coefficient tracking unit and the carrier phase error correcting unit of FIG. 3, and FIG. 6 is a view illustrating the detailed structure of the error detector of FIG. 5.

Referring to FIG. 5, the channel equalization coefficient tracking unit 130 can include a combination of 2L-point FFTs 131a and 131b, a channel equalizer 132, a frequency domain decision-directed channel tracker 133, and a 2L-point IFFT 134. Also, the carrier phase error correcting unit 140 can include a combination of a decider 141, an abnormality detector 142, a phase locked loop (PLL) 143, an error detector 144, and a multiplier 145. Here, referring to FIG. 6, the error detector 144 can include a summer 201 and a multiplier 202 to multiply a difference between a correction value of a QAM signal received during the payload section and a result value obtained by making a hard decision of the correction value by a carrier phase offset value to detect an error.

The usage of a preamble used by the single-carrier high speed wireless communication system having the above-described structure is illustrated in FIG. 7. A first section 310 of the preamble 10 is used for obtaining initial synchronization such as energy perception, automatic gain control (AGC), packet timing obtaining, and carrier frequency offset estimation. A second section 320 of the preamble section 10 is used for obtaining an initial channel equalization coefficient using only two CAZAC sequences. The second section 320 uses a section starting from an intermediate section of the CAZAC sequence, which is intended for performing non-causal channel estimation. Last, a third section 330 of the preamble section 10 is used for calculating a last point of the preamble section 10.

A method for channel equalization and carrier recovery in a receiver of the single-carrier high speed wireless communication system having the above-described structure is described with reference to the accompanying drawings.

FIG. 8 is a view illustrating a process for channel equalization and carrier recovery according to an embodiment of the present invention.

Referring to FIG. 8, when a packet is received in operation 400, the receiver obtains an initial value of an equalization coefficient through the initial equalization coefficient obtaining unit 110 during the preamble transmission section 10. After that, the receiver corrects the size of a high-order QAM signal using data of the header section 21 of the data transmission section 20, and then corrects the QAM signal such that the QAM signal has an appropriate position on a complex coordinate plane in operation 410.

After that, when the payload section 22 starts, the receiver updates the channel equalization coefficient using a decision-directed method through the channel equalization coefficient tracking unit 130 in operation 420, and estimates and corrects carrier phase offset through the carrier phase error correcting unit 140 in operation 430.

After that, the receiver judges whether a signal is located at an end point of the payload section 22, in operation 440, and when the packet is ended, the receiver returns to operation 400 to stand by for obtaining an initial value.

The process for channel equalization and carrier recovery is described in more detail below.

Referring to FIG. 4, a reception signal corresponding to C(L−npr+1) of a preamble P7 sequence is applied to an input terminal of the initial channel equalization coefficient obtaining unit 110. That is, a reception signal corresponding to an intermediate section of a CAZAC sequence is input during the preamble transmission section of the packet. Here, npr means the length of a non-causal portion of an estimated channel, and an L value is given by 16.

The above input reception signal is delivered to the L-point FFT 111 through the upper path, and to the memory 112 and the summer 114b through the lower path.

The initial channel equalization coefficient obtaining unit 110 transforms the reception signal input through the upper path into a signal in the frequency domain using the L-point FFT 111, and multiplies the transformed signal in the frequency domain by a T sequence as illustrated in Table 2 through the multiplier 113a to obtain a frequency spectrum of a non-causal channel. After that, the initial channel equalization coefficient obtaining unit 110 outputs two signals through a series of operations by the conjugates 115a and 115b, and the multiplier 113b. One of the output two signals is delivered to the L-point IFFT 117, and the other is delivered to the summer 114b.

TABLE 2

| T sequence | $0.5 - j0.5, 0.5 - j0.5, 0.5 - j0.5, 0.5 - j0.5, -0.5 - j0.5,$ $-0.5 + j0.5, 0.5 + j0.5, 0.5 - j0.5, -0.5 + j0.5, 0.5 - j0.5,$ $-0.5 + j0.5, 0.5 - j0.5, 0.5 + j0.5, -0.5 + j0.5, -0.5 -$ $j0.5, 0.5 - 0.5$ |
|---|---|

Meanwhile, the initial channel equalization coefficient obtaining unit 110 calculates a noise dispersion value for obtaining a non-causal equalization coefficient using the reception signal input through the lower path. That is, the initial channel equalization coefficient obtaining unit 110 calculates a difference value between an input value of the reception signal delivered through the lower path and a value before an L symbol stored in the L-element memory 112 using the summer 114b, and multiplies this difference value by a complex conjugate, which is an output of the conjugate 115c using the multiplier 113c. The multiplied value is input to a shifter 116. Accordingly, the initial channel equalization coefficient obtaining unit 110 calculates sum of L complex numbers using L result values input through the shifter 116 and shifts the sum to the right by 5 bits to obtain the noise dispersion value. The noise dispersion value is demultiplexed at an L Demux and input to the summer 114b.

The summer 114b of the initial channel equalization coefficient obtaining unit 110 adds a signal output from the multiplier 113b and a demultiplexed output. An output signal from the summer 114b is divided by an output signal from the conjugate 115a, and delivered to the L-point IFET 117. Accordingly, the L-point IFET 117 transforms an input signal into a signal in the time domain. The transformed signal in the time domain passes through the mapper 118 and a 2L-point IFET 119, so that an initial value of the channel equalization coefficient is finally obtained. Here, the mapper 118 rotates L output positions of the IFET 119 by r.

An amount of calculations during a process of transforming a signal into a signal in the time domain to obtain the initial value of the final channel equalization coefficient, that is, during a process performed at the L-point IFET 117, the mapper 118, and the 2L-point IFET 119 needs to be reduced, which is described below.

Math Figure 1 below shows a final equalization coefficient in a frequency domain.

$$W(k) = \frac{(-1)^k}{L}\sum_{k=0}^{L-1} \overline{W}(p)A(k, p), k = 0, \ldots, 2L-1$$

where
$\overline{w}(p)$
is an output obtained by division, and A(k,p) is a constant that can be calculated in advance depending on an L value. A(k,p) is given by Math Figure 2.

$$A(k, p) = \sum_{n=0}^{L-1} e^{-j\frac{2\pi}{L}\left(\frac{k}{2}-p\right)n} = \delta\left(\frac{k}{2}-p\right)e^{-j\frac{2\pi r}{L}p}, k: \text{ even number}$$

$$\sum_{n=0}^{L-1} e^{-j\frac{2\pi}{L}\left(\frac{k}{2}-p\right)n}e^{-j\frac{2\pi r}{L}p}, k: \text{ odd number}$$

where r is a rotation constant of the mapper 118. Comparison of an amount of calculation using Math Figures 1 and 2 with that of calculation performed by the L-point IFFT 117, the mapper 118, and the 2L-point IFFT 119 is given by Table 3.

TABLE 3

| method | Amount of calculation (number of real number multiplications) |
|---|---|
| (117, 118, 119) block | 0 (k: even number) |
| Math FIGS. 1 and 2 | 4L (k: odd number) |

In the case where Math Figures 1 and 2 are used, multiplication is not required when K is even number, and the number of real number multiplications is reduced by $3L(\log_2 L-1)$ when k is odd number. Therefore, a method using Math Figures 1 and 2 requires a less number of calculations unless L=1.

The above-calculated initial value of a channel equalization coefficient is input to the signal correcting unit 120 using a high-order QAM. The signal correcting unit 120 operates during the header section 21 inside the data transmission section 20, which is descried with reference to the accompanying drawings.

FIG. 9 is a view illustrating a process for high-order QAM signal correction according to an embodiment of the present invention.

Referring to FIG. 9, the signal correcting unit 120 accumulates an absolute value of data received during the header section 21 as shown in Math Figure 3, taking notice that data of the header section 21 has a predetermined size, which is a QPSK signal in operation 500.

$$g=g+abs(\text{header receive data}), i=i+1$$

where abs is an absolute value of header reception data i.

After that, the signal correcting unit 120 checks whether i is less than 56 in operation 510. When i is less than 56 in operation 510, the signal correcting unit 120 performs operation 500, and otherwise performs operation 520.

An average signal size gd is obtained by multiplying the accumulated value g by 0.0179 in operation 520. A constant G for QAM signal correction is obtained by dividing the size D of desired header data by the average signal size gd in operation 530. Here, the constant G is used for the signal correcting unit 120 to correct the size of QAM signal of the payload.

As described above, the QAM signal corrected by the signal correcting unit 120 is input to the channel equalization coefficient tracking unit 130. That is, a high-order QAM transmission signal transmitted from a transmission block is distorted by a multi-path phenomenon generated by indoor environment, has an additive white Gaussian noise generated by a channel and the receiver added thereto, and is received to an input terminal as illustrated in FIG. 5.

The operations of the channel equalization coefficient tracking unit 130 receiving and processing the corrected QAM signal, and the carrier phase error correcting unit 140 connected to the channel equalization coefficient tracking unit 130 are described in detail with reference to FIG. 6. Here, an input signal is provided to a block including L(=16) symbols and processed. An equalization coefficient of the channel equalizer 132 is initialized before the data transmission section 20 starts. At this point, the initial value is obtained from the preamble section 10 by the channel equalization coefficient obtaining unit 110.

Referring to FIG. 5, a reception signal input to the channel equalization coefficient tracking unit 130 is transformed into a signal in the frequency domain using an overlap-save method through a 2L-point FFT 131a, and input to the channel equalizer 132. The channel equalizer 132 has a block multiplier structure in the frequency domain.

Also, a signal input from the carrier phase correcting unit 140 is transformed into a signal in the frequency domain at the 2L-point FFT 131b and input to the channel tracker 133. Accordingly, the channel tracker 133 updates an equalization coefficient through frequency domain decision-based channel tracking. For this purpose, the channel tracker 133 uses Math Figure 4.

$$W_{k+1}^i = W_k^i + \frac{\mu}{\|R_k^i\|^2} R_k^* FFT\{[0e(kL)e^{f\theta(kL)} \ldots e(kL+L-1)e^{f\theta(kL+L-1)}]\}$$

where i (i=0, 1, ..., L−1) is a tap of an i-th equalization coefficient, k is an block index, L is a block size, n is a time index, ∥ is a norm operator, $R_k$ is a signal in the frequency domain of a reception signal in a k-th block, e is an output value of the error detector 144, and $e^{j\theta}$ is an output value of the PLL 143.

A signal equalized using the updated channel equalization coefficient at the channel equalizer 132 is transformed into a signal in the time domain by the 2L-point IFFT 134, and is multiplied at the multiplier 145 by an output value (carrier error offset) of the PLL 143 of the carrier phase error correcting unit 140. That is, the error correcting unit 140 removes a carrier error offset from a signal transformed into the time domain. A QAM signal output from the multiplier 145 is precisely corrected by the signal correcting unit 120.

The carrier phase error correcting unit 140 receives a corrected signal from the signal correcting unit 120 to make a hard decision of the corrected signal using the decider 141 to calculate an actual value of the signal, and receives the value of a signal input from the signal correcting unit 120 through the phase detector 142, and the actual value to calculate a phase difference of the two values. Here, for a method of calculating the phase difference, a method of obtaining an imaginary part from a complex multiplication result of two signals to use the obtained imaginary part as a phase difference.

A phase value detected by the phase detector 142 is input to the PLL 143, which estimates a phase offset of a carrier wave using the detected phase value. That is, the PLL 143 applies the phase value to a loop filter to obtain a low frequency wave phase value and obtains a complex rotational variable having the low frequency wave phase value using a numerically controlled oscillator (NCO). The above-obtained complex rotational variable is input to the multiplier 145.

Meanwhile, the error detector 144 receives an actual value output from the decider 141 and an output value of the phase detector 142 to detect an error using the summer 201 and a multiplier 202 as illustrated in FIG. 6 and input the detected signal to the 2L-point FFT 132 of the channel equalization coefficient tracking unit 130.

The operation processes of the channel equalization coefficient tracking unit 130 and the carrier phase error correcting unit 140 are repeatedly performed until the data transmission section 20 ends.

When a design method for channel equalization coefficient obtaining, channel equalization, and carrier phase offset correction according to an embodiment of the present invention is applied, the present invention can perform high speed data communication using single-carrier transmission having a simple structure and low power consumption in an indoor environment where channel distortion due to multi-path is serious.

The embodiment of the present invention can use a very small number of CAZAC sequences by estimating a non-causal channel in the frequency domain, and thus can use a larger number of CAZAC sequences in initial synchronization operations such as automatic gain control (AGC), packet timing obtaining, carrier frequency offset estimation than a conventional channel equalization method. Therefore, an initial synchronization unit having higher performance can be designed.

Also, regarding high-order QAM signal correction provided by an embodiment of the present invention, the decider can make a precise signal decision, so that a high-order QAM signal can be easily used. Therefore, since the frequency band of a signal being used can be reduced as the order of a QAM signal is raised, the efficiency of a frequency band used can be increased. Also, in an embodiment of the present invention, an initial channel equalization coefficient of the frequency band for high speed convolution such as overlap-save can be calculated using a small number of calculations. Since a number of calculations upon channel equalization during a data section is smaller than a number of calculations in the conventional SC-FDE, power consumption can be reduced. For example, comparison of channel equalization provided by an embodiment of the present invention with the conventional SC-FDE shows a difference in a number of calculations. Here, the channel equalization according to an embodiment of the present invention is applied to 802.15.3 having a speed of 55 Mbps, and the SC-FDE is applied to 802.11a having a speed of 54 Mbps.

TABLE 4

| | Number of real number multiplications |
|---|---|
| SC-FDE applied to 802.11a (54 Mbps) | $432 \times 10^6$ |
| Channel equalization applied to 802.15.3 (55 Mbps) | $352 \times 10^6$ |

Comparison of a number of real number multiplications per unit time in the two cases shows that the channel equalization provided by the embodiment of the present invention can save multiplication operations compared to the conventional SC-FDE by about $80 \times 10^6$.

Meanwhile, although embodiments have been described with reference to a number of illustrative embodiments thereof, it should be understood that numerous other modifications and embodiments can be devised by those skilled in the art that will fall within the spirit and scope of the principles of this disclosure. Therefore, the scope of the present invention should not be limited to the embodiment set forth herein but determined by the appended claims and equivalents thereof.

The invention claimed is:

1. A channel equalization and carrier recovery method in a high speed wireless communication system, the method comprising:
    obtaining, an initial value of a channel equalization coefficient through non-causal channel estimation in a frequency domain during a preamble transmission section of a packet;
    performing high-order quadrature amplitude modulation (QAM) signal correction for updating the channel equalization coefficient in a time domain during a data transmission section of the packet;
    updating the channel equalization coefficient by performing channel equalization coefficient tracking on the basis of a decision in the frequency domain when a payload section starts in the data transmission section of the packet; and
    correcting a carrier phase error by making a hard decision of a correction value by the high-order QAM signal correction in the time domain.

2. The method of claim 1, wherein the updating of the channel equalization coefficient comprises repeatedly performing the updating up to a last frame of the packet using the correction value of the high-order QAM signal corrected during the payload section.

3. The method of claim 1, wherein the obtaining the initial value of the channel equalization coefficient comprises:
receiving a reception signal corresponding to a CAZAC (constant amplitude zero auto-correlation) intermediate section during the preamble transmission section of the packet;
obtaining frequency spectrum of a non-causal channel using a reception signal input through an upper path;
obtaining a noise dispersion value for a non-causal equalization coefficient using a reception signal input through a lower path;
obtaining a non-causal equalization coefficient in the time domain using output values from the upper path and the lower paths; and
obtaining the initial value of a final channel equalization coefficient by rotating the non-causal equalization coefficient in the time domain, and transforming the same into a coefficient in the frequency domain using a mapper.

4. The method of claim 3, wherein the obtaining of the initial value of the final channel equalization coefficient comprises obtaining 2L non-causal equalization coefficients in the frequency domain using Math Figure 1:

$$W(k) = \frac{(-1)^k}{L} \sum_{k=0}^{L-1} \overline{W}(p) A(k, p), k = 0, \ldots, 2L-1$$

where
$\overline{W}(p)$ is an output obtained by division, and $A(k,p)$ is a constant that is calculated in advance depending on an L value.

5. The method of claim 4, wherein the constant $A(k,p)$, which is the constant calculated in advance depending on the L value, is obtained using Math Figure 2:

$$A(k, p) = \sum_{n=0}^{L-1} e^{-j\frac{2\pi}{L}\left(\frac{k}{2}-p\right)n} = \delta\left(\frac{k}{2} - p\right) e^{-j\frac{2\pi r}{L}p}, k: \text{ even number}$$

$$\sum_{n=0}^{L-1} e^{-j\frac{2\pi}{L}\left(\frac{k}{2}-p\right)n} e^{-j\frac{2\pi r}{L}p}, k: \text{ odd number}$$

where r is a rotation constant of the mapper.

6. The method of claim 3, wherein the noise dispersion value is obtained by calculating a difference value between the reception signal input through the lower path and a signal stored in a memory, summing L values obtained by multiplying the difference value by a complex conjugate, and shifting the summed value by 5 bits.

7. The method of claim 3, wherein the frequency spectrum of the non-causal channel is obtained by transforming the reception signal into signals in L frequency domains, and multiplying the signals by a T-sequence.

8. The method of claim 1, wherein the performing of the high-order QAM signal correction comprises:
accumulating an absolute value of a header signal received during a header section;
multiplying the accumulated value by a constant to obtain an average accumulation value;
obtaining a constant for the high-order QAM signal correction by dividing a size of the header signal by the average accumulation value; and
correcting a size of the high-order QAM signal using the obtained constant when the payload section starts.

9. The method of claim 1, wherein the correcting a carrier phase error comprises:
transforming the high-order QAM signal in the frequency domain into a signal in the time domain during the payload section;
removing carrier phase offset from the high order QAM signal transformed in the time domain;
correcting a size of the high-order QAM signal from which the carrier phase offset has been removed; and
detecting an error upon correction of the high-order QAM signal.

10. The method of claim 9, wherein the detecting of the error upon correction of the high-order QAM signal comprises multiplying a difference value between the hard decision result of the correction value of the high-order QAM signal and the correction value by the carrier phase offset value to detect the error.

11. The method of claim 9, wherein the updating of the channel equalization coefficient comprises updating the channel equalization coefficient into a result value of decision-directed tracking in the frequency domain using Math Figure 4:

$$W_{k+1}^i = W_k^i + \frac{\mu}{\|R_k^i\|^2} R_k^* FFT\{[0e(kL)e^{j\theta(kL)} \ldots e(kL+L-1)e^{j\theta(kL+L-1)}]\}$$

where i (i=0, 1, . . . , L−1) is a tap of an i-th equalization coefficient, k is an block index, L is a block size, n is a time index, ∥ is a norm operator, $R_k$ is a signal in the frequency domain of a reception signal in a k-th block, e is an output value of an error detector, and $e^{j\theta}$ is an output value of a phase locked loop.

12. A receiving apparatus comprising:
an channel equalization coefficient obtaining unit for obtaining an initial value of a channel equalization coefficient through non-causal channel estimation in a frequency domain during a preamble transmission section of a packet;
a signal correcting unit for correcting a high-order QAM signal for updating the channel equalization coefficient in a time domain during a data transmission section of the packet;
a channel equalization coefficient tracking unit for updating the channel equalization coefficient through channel equalization coefficient tracking on the basis of frequency domain decision when a payload section starts in the data transmission section of the packet; and
a carrier phase error correcting unit for making a hard decision of a correction value by the high-order QAM signal correction in the time domain to output carrier phase offset, and detecting and correcting a carrier phase error.

13. The apparatus of claim 12, wherein the channel equalization coefficient obtaining unit receives a reception signal corresponding to a CAZAC (constant amplitude zero auto-correlation) intermediate section during the preamble transmission section of the packet, and comprises:

an upper path unit comprising a first fast Fourier transformer for transforming the received reception signal into a signal in the frequency domain;

a multiplier for multiplying the transformed signal by a T-sequence to obtain a frequency spectrum of a non-causal channel;

a lower path unit for obtaining a noise dispersion value for obtaining a noncausal equalization coefficient using the received reception signal;

an inverse fast Fourier transformer for transforming a result value obtained by operating output values from the upper and lower path units into a value in the time domain;

a mapper for rotating an output value of the inverse Fast Fourier transformer to obtain a non-causal equalization coefficient in the time domain; and a second fast Fourier transformer for transforming the output value from the mapper to obtain 2L non-causal equalization coefficients in the frequency domain.

14. The apparatus of claim 13, wherein the initial channel equalization coefficient obtaining unit obtains initial values of the 2L non-causal equalization coefficients in the frequency domain using Math Figure 1:

$$W(k) = \frac{(-1)^k}{L} \sum_{k=0}^{L-1} \overline{W}(p) A(k, p), k = 0, \ldots, 2L-1$$

where $\overline{W}(p)$ is an output obtained by division, and $A(k,p)$ is a constant that is calculated in advance depending on an L value.

15. The apparatus of claim 14, wherein the initial channel equalization coefficient obtaining unit obtains the constant $A(k,p)$, which is the constant calculated in advance depending on the L value using Math Figure 2:

$$A(k, p) = \sum_{n=0}^{L-1} e^{-j\frac{2\pi}{L}(\frac{k}{2}-p)n} = \delta\left(\frac{k}{2}-p\right)e^{-j\frac{2\pi r}{L}p}, k: \text{ even number}$$

$$\sum_{n=0}^{L-1} e^{-j\frac{2\pi}{L}(\frac{k}{2}-p)n} e^{-j\frac{2\pi r}{L}p}, k: \text{ odd number}$$

where r is a rotation constant of the mapper.

16. The apparatus of claim 13, wherein the noise dispersion value is obtained by calculating a difference value between the reception signal input through the lower path and a signal stored in a memory, summing L values obtained by multiplying the difference value by a complex conjugate, and shifting the summed value by 5 bits.

17. The apparatus of claim 12, wherein the signal correcting unit accumulates an absolute value of a header signal received during a header section, and multiplies the accumulated value by a constant to obtain an average accumulation value, divides a size of the header signal by the average accumulation value to obtain a constant for the high order QAM signal correction, and corrects a size of the high-order QAM signal using the obtained constant when the payload section starts.

18. The apparatus of claim 12, wherein the channel equalization coefficient tracking unit comprises:

a first fast Fourier transformer for transforming a signal input during the payload section into 2L signals in the frequency domain;

an inverse fast Fourier transformer for transforming a high-order QAM signal in the frequency domain into 2L high-order QAM signals in the time domain;

a second fast Fourier transformer for transforming the high-order QAM signal in the time domain output from the carrier phase error correcting unit into a signal in the frequency domain;

a channel tracker for performing decision-directed channel tracking in the frequency domain using a signal output from the second fast Fourier transformer; and a channel equalizer for updating the channel equalization coefficient using the channel tracking result.

19. The apparatus of claim 18, wherein the channel equalization coefficient tracking unit updates the channel equalization coefficient into a result value of the decision-directed channel tracking in the frequency domain using Math Figure 4:

$$W_{k+1}^i = W_k^i - \frac{\mu}{\|R_k^i\|^2} R_k^* FFT\{[0 e(kL)e^{f\theta(kL)} \ldots e(kL+L-1)e^{f\theta(kL+L-1)}]\}$$

where i (i=0, 1, . . . , L−1) is a tap of an i-th equalization coefficient, k is an block index, L is a block size, n is a time index, ∥ is a norm operator, $R_k$ is a signal in the frequency domain of a reception signal in a k-th block, e is an output value of an error detector, and $e^{j\theta}$ is an output value of a phase locked loop.

20. The apparatus of claim 18, wherein the channel equalization coefficient tracking unit tracks a high-order QAM signal output from the carrier phase error correcting unit until a last frame of the packet arrives to repeatedly perform the channel equalization coefficient update.

21. The apparatus of claim 12, wherein the carrier phase error correcting unit comprises:

a multiplier for removing carrier phase offset from a high-order QAM signal in the time domain output from the channel equalization coefficient tracking unit;

a decider for making a hard decision of the carrier phase offset-removed high-order QAM signal;

a phase detector for detecting a phase value of the hard decided-high-order QAM signal;

a phase locked loop for estimating carrier phase offset using the detected phase value; and an error detector for detecting an error of the high-order QAM signal using an input value and an output value of the decider.

22. The apparatus of claim 21, wherein the error detector multiplies a difference value between the input value and the output value of the decider by the carrier phase offset to detect the error.

* * * * *